United States Patent
Ohno

(10) Patent No.: US 8,055,748 B2
(45) Date of Patent: Nov. 8, 2011

(54) COMMUNICATION CONTROL SYSTEM, MOTOR VEHICLE, COMMUNICATION CONTROL PROGRAM, SYSTEM ESTABLISHING THE COMMUNICATION CONTROL SYSTEM, AND EXTERNAL SYSTEM

(75) Inventor: Tsuneo Ohno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 674 days.

(21) Appl. No.: 11/889,120

(22) Filed: Aug. 9, 2007

(65) Prior Publication Data

US 2008/0040357 A1 Feb. 14, 2008

(30) Foreign Application Priority Data

Aug. 10, 2006 (JP) ................. 2006-218261

(51) Int. Cl.
G06F 15/173 (2006.01)
(52) U.S. Cl. ...................................... 709/223
(58) Field of Classification Search .................. 709/223, 709/221
See application file for complete search history.

(56) References Cited

U.S. PATENT DOCUMENTS

| | | | |
|---|---|---|---|
| 6,728,531 B1 | 4/2004 | Lee et al. | |
| 7,623,193 B2 * | 11/2009 | Kim ................................ | 349/43 |
| 7,653,045 B2 * | 1/2010 | Anandakumar et al. ...... | 370/352 |
| 2004/0192189 A1 | 9/2004 | Yuhara et al. | |
| 2006/0010437 A1 | 1/2006 | Marolia | |

FOREIGN PATENT DOCUMENTS

| | | | |
|---|---|---|---|
| GB | 2 403 629 A | 1/2005 |
| JP | 2002-162232 A | 6/2002 |
| JP | 2002-369234 A | 12/2002 |
| JP | 2003-18317 A | 1/2003 |
| JP | 3498887 B2 | 12/2003 |

* cited by examiner

*Primary Examiner* — David Eng

(74) *Attorney, Agent, or Firm* — Arent Fox, LLP

(57) ABSTRACT

An information management system and the like capable of managing communication processing by an internal system mounted on a mobile apparatus such as a motor vehicle to ensure efficient use of information processing resources for packets distributed from an external system are provided. According to the information management system (100), a first processing section (110) determines necessity/unnecessity of a file for an information processing device (12) mounted on the motor vehicle based on file information about the content of the file distributed or transmitted from an external system (20). If the first processing section (110) determines that the file is necessary for the information processing device (12), a second processing section (120) causes the internal system (10) to execute "relay processing" of the file including collection and accumulation of packets, decoding of the packets to restore the file, and others.

11 Claims, 2 Drawing Sheets

COMMUNICATION CONTROL SYSTEM, MOTOR VEHICLE, COMMUNICATION CONTROL PROGRAM, SYSTEM ESTABLISHING THE COMMUNICATION CONTROL SYSTEM, AND EXTERNAL SYSTEM

CROSS-REFERENCE TO RELATED APPLICATION

This application claims priority of Japanese Application No. 2006-218261, filed Aug. 10, 2006, the disclosure of which is hereby incorporated in its entirety by reference.

BACKGROUND OF THE INVENTION

1. Field of the Invention

The present invention relates to a system (information management system) managing an operation of an internal system mounted on a mobile apparatus, a motor vehicle as the mobile apparatus provided with the information management system, a program providing a computer mounted in the mobile apparatus with the function of managing the internal system, a system establishing the information management system, and an external system distributing or broadcasting packets to be collected or otherwise processed by the internal system.

2. Description of the Related Art

Information processing devices mounted on a motor vehicle, such as a navigation device, a traveling control device and the like, have their functions updated as software stored in a memory of each device is updated, to ensure improvement in user-friendliness of the motor vehicle as well as the information processing devices. The software is updated as the data for updating of the software is transmitted or distributed from the distribution source to the information processing device (see Japanese Patent No. 3498887).

It however would be inappropriate from the standpoint of effective use of information processing resources if the packets are collected and accumulated unconditionally, and once the necessary packets are accumulated, they are decoded to restore a file, and the file is transferred to the information processing device. Specifically, in the case where the file is unusable for a target, or in the case where there is no target as the destination of the file, the information processing resources would be wasted for accumulation, decoding and outputting of the packets. Further, spending the resources for reception of a useless file and the like may slow down the speed to collect useful data. Such disadvantages become more serious as the number of packets constituting the file increases.

SUMMARY OF THE INVENTION

In view of the foregoing, an object of the present invention is to provide an information management system that can manage communication processing by an internal system mounted on a mobile apparatus, such as a motor vehicle, to efficiently use information processing resources for packets distributed from an external system, a motor vehicle as a mobile apparatus provided with the information management system, a program providing the information management function to a computer mounted in the mobile apparatus, a method for configuring an information management system, a server for implementing the method, and an external system.

According to a first aspect of the present invention, there is provided an information management system for managing relay processing including collection and accumulation of packets distributed or broadcast from an external system by an internal system mounted on a mobile apparatus, decoding of the accumulated packets to restore a file, and outputting of the file to an information processing device mounted on the mobile apparatus, which includes: a first processing section to determine necessity/unnecessity of the file for the information processing device based on file information about a content of the file distributed or broadcast from the external system; and a second processing section to cause the internal system to execute the relay processing of the file on the condition that it is determined by the first processing section that the file is necessary for the information processing device.

According to the information management system of the first aspect of the invention, necessity/unnecessity of the file for the information processing device mounted on the mobile apparatus is determined based on the "file information" distributed from the external system. As used herein, the "information processing device" is a concept that includes, besides the "device" itself, the "function" that is exerted by an application installed on the device. Further, the information processing device refers to some or all of one or more information processing devices. The "file information" is information about the content of the file, which may be the packets constituting the file, packets other than those packets, or a combination thereof.

The relay processing by the internal system is executed on the condition that the file is determined to be necessary for the information processing device. That is, when the file is determined to be unnecessary for the information processing device, the execution of the relay processing by the internal system is stopped. The relay processing includes collection of packets constituting the file, accumulation of the packets in the storage portion such as a memory, decoding of the accumulated packets to restore a file, and outputting of the file to the information processing device. Then, the file distributed in the form of a plurality of packets by the external system is used by the information processing device that needs the same, whereby information processing corresponding to the file and others can be carried out.

With the above processing, it is possible to prevent execution of undesirable processing where even the packets constituting the file unnecessary for the information processing device mounted on the mobile apparatus are unconditionally stored or accumulated, or even decoded. Further, the part of the resources (memory capacity for accumulation of the packets, information processing capabilities of CPU and/or LSI for decoding and others) for the relay processing that has been saved by stopping the execution of the relay processing can be allocated to the relay processing of another file or other information processing. Accordingly, the communication processing by the internal system mounted on the mobile apparatus such as a motor vehicle can be managed to efficiently use the information processing resources for the packets distributed from the external system.

The information management system according to a second aspect of the invention is characterized in that, in the information management system of the first aspect, the first processing section outputs the file information to the information processing device, and determines necessity/unnecessity of the file for the information processing device in accordance with a type or presence/absence of a response signal from the information processing device to the file information.

According to the information management system of the second aspect of the invention, necessity/unnecessity of the file for the information processing device is determined based on a response pattern of the information processing device with respect to the file information. The relay processing is then executed or stopped in accordance with the determination result as described above, which ensures efficient use of the resources required for the relay processing.

The information management system according to a third aspect of the invention is characterized in that, in the information management system of the first aspect, the first processing section determines necessity/unnecessity of the file for the information processing device in accordance with a type or presence/absence of a response signal from the information processing device to the file information for identification of an effective period or version of the file.

According to the information management system of the third aspect of the invention, determination as to whether the file is necessary for the information processing device is made in consideration of the effective period or version of the file.

The information management system according to a fourth aspect of the invention is characterized in that, in the information management system of the first aspect, the first processing section determines necessity/unnecessity of the file for the information processing device based on a result of communication with the information processing device identified by destination information distributed from the external system.

According to the information management system of the fourth aspect of the invention, necessity/unnecessity of the file for the information processing device is determined based on a result of communication with the information processing device designated by the destination information. As such, for example when the information processing device designated by the destination information is not mounted on the mobile apparatus, it is determined that the file is unnecessary for the other information processing device mounted on the mobile apparatus. In such a case, execution of the relay processing, including decoding of the accumulated packets to restore the file and outputting of the file to the information processing device as described above, is stopped to thereby ensure efficient use of the information processing resources for the relay processing.

The information management system according to a fifth aspect of the invention is characterized in that, in the information management system of the first aspect, the second processing section causes the internal system to stop accumulation of the packets constituting the file on the condition that it is determined by the first processing section that the file is unnecessary for the information processing device.

According to the information management system of the fifth aspect of the invention, accumulation of the packets constituting the file unnecessary for the information processing device mounted on the mobile apparatus is stopped. Accordingly, the information processing resources for the relay processing such as accumulation and decoding of the packets are allocated to the relay processing of the file necessary for the information processing device, thus ensuring efficient use of the resources for communication processing by the internal system.

The information management system according to a sixth aspect of the invention is characterized in that, in the information management system of the fifth aspect, after the second processing section causes the internal system to stop the accumulation of the packets constituting the file, on the condition that it is determined by the first processing section that the file is necessary for the information processing device, the second processing section causes the internal system to remove the stoppage of the accumulation of the packets.

According to the information management system of the sixth aspect of the invention, in the state where the file is unnecessary for the information processing device, accumulation of the packets constituting the file is stopped. Upon transition from this state to the state where the file is necessary for the information processing device, accumulation of the packets is restarted. That is, for the file that is currently unnecessary for the information processing device but may become necessary in the future, the packets constituting the file are accumulated to some degree, and collection and accumulation of those packets are restarted when the file actually becomes necessary. In this manner, compared to the case where collection and accumulation of the necessary packets are started after the change of the state, the time required for collecting and accumulating the packets necessary to restore the file that has now become necessary for the information processing device is reduced.

Meanwhile, the accumulated amount of the packets is restricted as described above, and therefore, the information processing resources for the relay processing of the file including accumulation of the packets can be allocated to the relay processing of the file necessary for the information processing device or other information processing.

The information management system according to a seventh aspect of the invention is characterized in that, in the information management system of the first aspect, the second processing section determines whether the time during which the accumulation of the packets is stopped has exceeded a threshold value, or whether the current time has passed an effective period of the packets or the file, and on the condition that it is determined that the time during which the accumulation of the packets is stopped has exceeded the threshold value or that the current time has passed the effective period of the packets or the file, the second processing section causes the internal system to erase or discard part or all of the accumulated packets.

According to the information management system of the seventh aspect of the invention, the packets constituting the file that is determined to be probably or certainly unnecessary for the information processing device can be erased. Accordingly, the information processing resources for accumulation of the packets and the like can be allocated to accumulation of the packets constituting the file that is necessary or very likely necessary for the information processing device. This ensures efficient use of the information processing resources for the relay processing of the file necessary for the information processing device to the relevant information processing device.

The information management system according to an eighth aspect of the invention is characterized in that, in the information management system of the first aspect, the first processing section recognizes a degree of necessity of each file for the information processing device based on the file information, and, on the condition that the accumulated amount of the packets by the internal system has reached an upper limit, the second processing section causes the internal system to preferentially erase or discard the packets constituting the file that is recognized to have a lower degree of necessity by the first processing section from among the accumulated packets.

According to the information management system of the eighth aspect of the invention, when the accumulated amount of the packets in the internal system has reached the upper limit, the packets of a lower level of importance for the information processing device are erased or discarded preferentially. Accordingly, the packets of a higher level of importance for the information processing device can be preferentially accumulated by the internal system, and the relay processing including restoration of the relevant packets to the file can be carried out preferentially.

According to a ninth aspect of the present invention, there is provided a motor vehicle as a mobile apparatus having mounted thereon an information management system for managing relay processing including collection and accumulation of packets distributed or broadcast from an external system by an internal system mounted on the mobile apparatus, decoding of the accumulated packets to restore a file, and outputting of the file to an information processing device mounted on the mobile apparatus, wherein the information management system includes: a first processing section to determine necessity/unnecessity of the file for the information processing device based on file information about a content of the file distributed or broadcast from the external system; and a second processing section to cause the internal system to execute the relay processing of the file on the condition that it is determined by the first processing section that the file is necessary for the information processing device.

According to the motor vehicle of the ninth aspect of the invention, the relay processing of the packets distributed from the external system executed by the internal system can be managed to ensure efficient use of the information processing resources.

According to a tenth aspect of the present invention, there is provided an information management program for causing a computer mounted in a mobile apparatus to function as an information management system for managing relay processing including collection and accumulation of packets distributed or broadcast from an external system by an internal system mounted on the mobile apparatus, decoding of the accumulated packets to restore a file, and outputting of the file to an information processing device mounted on the mobile apparatus, wherein the information management system includes: a first processing section to determine necessity/ unnecessity of the file for the information processing device based on file information about a content of the file distributed or broadcast from the external system; and a second processing section to cause the internal system to execute the relay processing of the file on the condition that it is determined by the first processing section that the file is necessary for the information processing device.

According to the information management program of the tenth aspect of the invention, the computer mounted in the mobile apparatus is provided with the function of managing the communication processing by the internal system mounted on the mobile apparatus to ensure efficient use of the communication processing resources for the packets distributed from the external system.

According to an eleventh aspect of the present invention, there is provided an establishment system for establishing a computer mounted in a mobile apparatus as an information management system by distributing or broadcasting part or all of an information management program to the computer, wherein the information management system manages relay processing including collection and accumulation of packets distributed or broadcast from an external system by an internal system mounted on the mobile apparatus, decoding of the accumulated packets to restore a file, and outputting of the file to an information processing device mounted on the mobile apparatus, and includes: a first processing section to determine necessity/unnecessity of the file for the information processing device based on file information about a content of the file distributed or broadcast from the external system; and a second processing section to cause the internal system to execute the relay processing of the file on the condition that it is determined by the first processing section that the file is necessary for the information processing device.

According to the system of the eleventh aspect of the invention, it is possible to establish, at an arbitrary timing, the information management system that manages communication processing by the internal system mounted on the mobile apparatus to efficiently use the communication processing resources for the packets distributed or broadcast from the external system. It is noted that part of the program is a concept that includes the part providing the first and second processing functions, smaller parts constituting the relevant part, or any combination thereof.

According to a twelfth aspect of the present invention, there is provided an external system which distributes or broadcasts packets to be collected and accumulated by an internal system mounted on a mobile apparatus, wherein the external system further distributes or broadcasts file information about a content of a file so as to cause an information management system, which manages relay processing including decoding of the packets accumulated by the internal system to restore a file, and outputting of the file to an information processing device mounted on the mobile apparatus, to determine necessity/unnecessity of the file for the information processing device based on the file information, and to cause the information management system to allow the internal system to execute the relay processing of the file in response to a determination result that the file is necessary.

According to the external system of the twelfth aspect of the invention, it is possible to cause the information management system mounted on the mobile apparatus to determine necessity/unnecessity of the file for the information processing device mounted on the mobile apparatus based on the file information about the content of the relevant file. Further, it is possible to cause the information management system to allow or stop execution of the relay processing by the internal system in accordance with the determination result.

DESCRIPTION OF THE PREFERRED EMBODIMENTS

Embodiments of an information management system, a mobile apparatus, an information management program, a system establishing the information management system, and an external system of the present invention will now be described with reference to the drawings.

Figure 1:
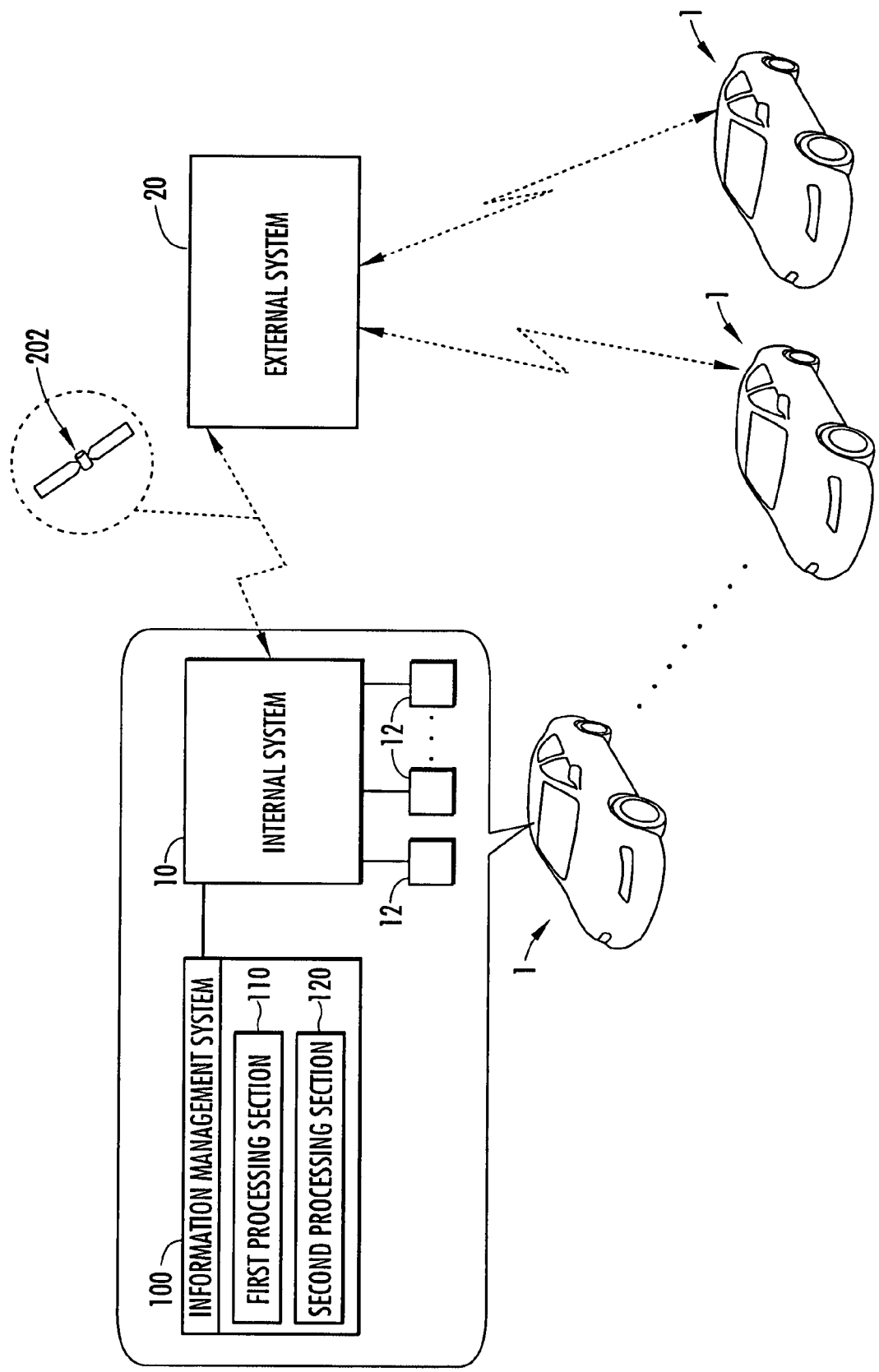
FIG. 1 illustrates configurations of an information management system and others according to an embodiment of the present invention.

Firstly, the configurations of the information management system and others will be described with reference to FIG. 1. A motor vehicle (mobile apparatus) 1 shown in FIG. 1 is provided with an internal system 10, a plurality of information processing devices 12, and an information management system 100.

Internal system 10 is composed of a CPU, a ROM, a RAM, an I/O and others, and carries out "relay processing" of a file, which includes: receiving or collecting the packets distributed or broadcast from an external system 20 and accumulating them in a storage portion such as a memory, decoding a plurality of packets accumulated in the storage portion to restore a file (data or program), and outputting the file to information processing device 12.

Information processing devices 12 may include a navigation device, a device controlling the behavior of motor vehicle 1 in accordance with the outputs of a speed sensor, a yaw rate sensor and other sensors (not shown), an air-conditioning device, a power window control device, and others.

Information management system 100 is composed of: an ECU or a computer (having CPU, ROM, RAM, I/O and others; LSI may be adapted therefor) as hardware mounted in motor vehicle 1; and an "information management program" of the present invention as software stored in a memory and providing various functions to the computer. While the information management program may be stored from the beginning in a memory of the computer mounted in the motor vehicle, part or all of the program may be distributed or broadcast from external system 20 or other system (not shown) via a network or satellite to the computer mounted in the motor vehicle, at an arbitrary timing such as upon a request from the computer, and stored in the memory. Further, part or all of the information management program of the present invention may be distributed or downloaded as files from external system 20 to the computer constituting information management system 100.

While internal system 10, information processing devices 12 and information management system 100 are shown independent from each other in FIG. 1, their relation in terms of inclusion or dependency may take various forms. For example, (1) information management system 100 and information processing devices 12 may be independently included in internal system 10, (2) internal system 10 may include information processing devices 12, and information processing device 12 may include information management system 100, (3) internal system 10 and information processing devices 12 may be independent, and information management system 100 may be included in internal system 10, or, (4) internal system 10 and information processing devices 12 may be independent, and information management system 100 may be included in information processing device 12. Furthermore, internal system 10, information processing devices 12 and information management system 100, which are independent from each other as shown in FIG. 1, may communicate via a network in the motor vehicle which is composed of CAN or the like, or alternatively, internal system 10 and information management system 100 included therein may communicate via a communication circuit within the ECU.

Information management system 100 includes a first processing section 110 and a second processing section 120.

First processing section 110 determines whether a file is necessary for a respective information processing device 12, based on "file information" about the content of the relevant file distributed from external system 20.

Second processing section 120 causes internal system 10 to execute the relay processing of the file, on the condition that first processing section 110 determines that the file is necessary for information processing device 12. If first processing section 110 determines that the file is unnecessary for information processing device 12, second processing section 120 causes internal system 10 to stop execution of the relay processing of the file.

External system 20 is composed of one or more servers (having CPU, ROM, RAM, I/O and others), and distributes or broadcasts file information via a network or a satellite 202.

Further, external system 20 divides a file into packets, and distributes or broadcasts the packets to internal system 10 via the network or satellite 202.

The functions of the information management system and others configured as described above will now be described with reference to FIG. 2.

Initially, "file information", "destination information", a "file identifier" and a "decode parameter" are distributed or broadcast from external system 20, which are received by a receiver of internal system 10 or a receiver of a mobile phone or the like connected to internal system 10. The timings or the time zones for distributing the "file information", the "destination information", the "file identifier" and the "decode parameter" may be the same or different from each other, and they may be received by one receiver or may be received by a plurality of receivers respectively. The "file information" is the information about the content of the file, which identifies an effective period or version of the file, for example. The "destination information" designates information processing device 12 as a destination (target) of the file. The "file identifier" is for identification of the file, which is used, when collecting the packets of the file, to determine whether each packet corresponds to the one constituting the file. The "decode parameter" includes information necessary for decoding the packets accumulated in the memory to restore the file, such as the ordering of the packets and others.

Figure 2:
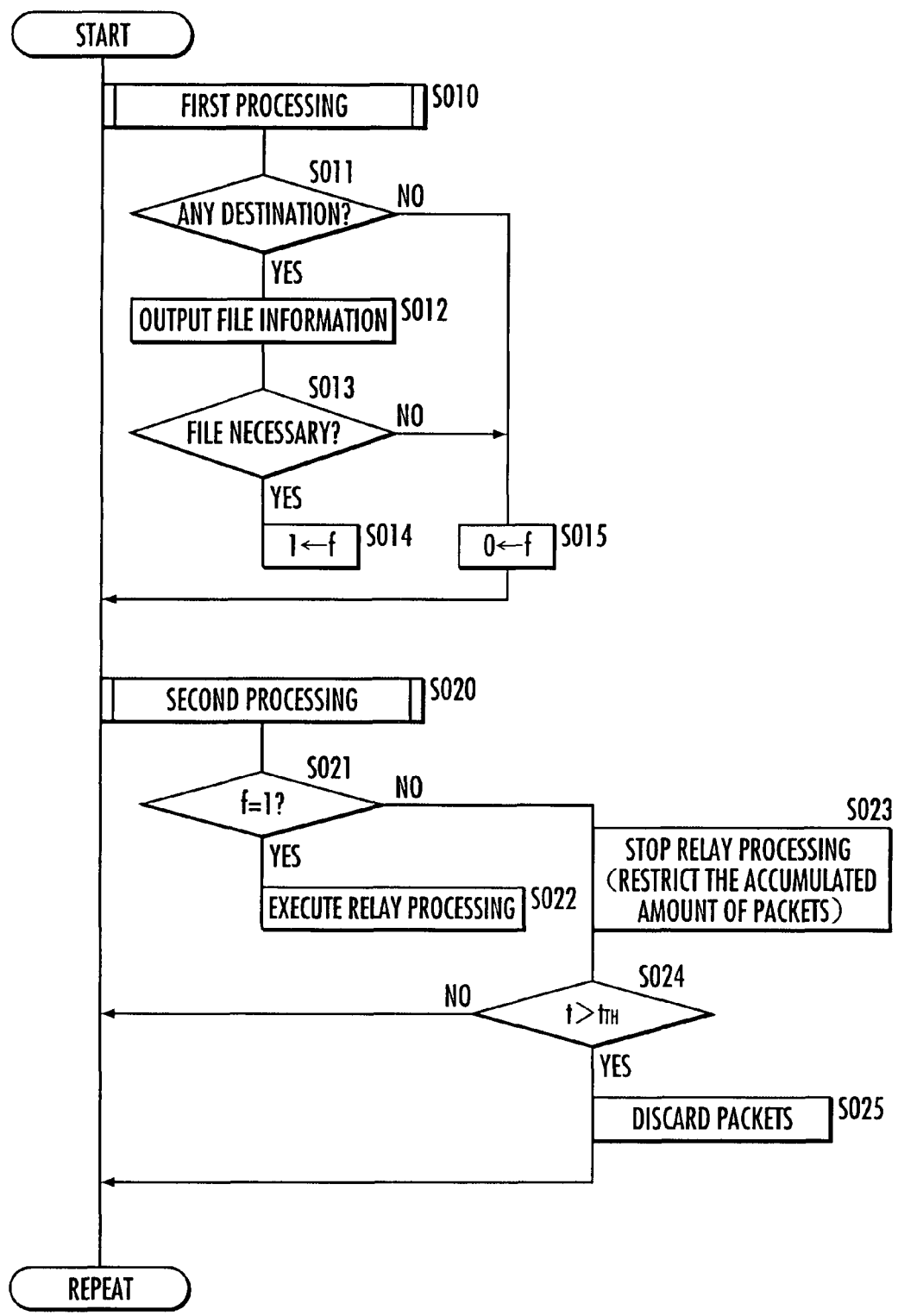
FIG. 2 illustrates functions of the information management system and others according to the embodiment of the present invention.

Next, first processing section 110 executes "first processing" (FIG. 2: S010).

Specifically, first processing section 110 determines presence/absence of information processing device 12 as a destination of the file, which is identified by the destination information received by internal system 10 (FIG. 2: S011). For example, the presence/absence of information processing device 12 as the destination of the file is determined according to whether the destination information stored in advance in the memory for identification of information processing devices 12 mounted on motor vehicle 1 includes the one that matches the destination information received by internal system 10.

If first processing section 110 determines that there is information processing device 12 that becomes the destination of the file (FIG. 2: YES in S011), it outputs the "file information" to the relevant information processing device 12 (FIG. 2: S012). It is noted that transmission and reception of the destination information may be omitted, and instead, first processing section 110 may output the file information to all the information processing devices 12 mounted on motor vehicle 1.

Further, first processing section 110 determines whether the file is necessary for information processing device 12 based on a response pattern of the relevant information processing device 12 to the file information (FIG. 2: S013). For example, when a response signal is returned from information processing device 12 in response to the file information, it is determined that the file is necessary for the information processing device 12 (FIG. 2: YES in S013). In response, a flag "f" representing whether the file is necessary or not is set to "1" (FIG. 2: S014). Meanwhile, if the response signal is not returned, it is determined that the file is unnecessary for the information processing device 12 (FIG. 2: NO in S013). In response, the flag "f" is set to "0" (FIG. 2: S015).

It may be configured such that it is determined that the file is necessary for information processing device 12 when a response signal of a first type is returned from the relevant information processing device 12 in response to the file information, and it is determined that the file is unnecessary for information processing device 12 when a response signal of a second type that is different from the first type is returned from the information processing device 12 in response to the file information. It may also be configured such that first processing section 110 reads necessity/unnecessity information stored in advance in the memory of internal system 10 or the like, instead of communicating with information processing devices 12, to determine whether the file is necessary for respective information processing devices 12 based on the necessity/unnecessity information.

When the file information is the information about the effective period or version of the file, determination as to whether the file is necessary for information processing device 12 is made in consideration of the effective period or version of the file.

Subsequently, second processing section 120 executes "second processing" (FIG. 2: S020).

Specifically, when first processing section 110 determines that the file is necessary for information processing device 12 (FIG. 2: YES in S021), second processing section 120 causes internal system 10 to execute the "relay processing" (FIG. 2: S022). The relay processing includes: collecting packets having the file identifier identifying the file from among the packets distributed from external system 20, accumulating the relevant packets in a storage portion such as a memory, decoding the accumulated packets based on the decode parameter to restore (and verify) the file, and outputting the file to information processing device 12 via an output circuit. Then, the file distributed as a plurality of packets by external system 20 is used by information processing device 12 that needs the file, and the information processing corresponding to the file is executed. For example, when the file is the software for providing an additional function to the navigation device as information processing device 12, setting of a recommended route by the added function is executed by the navigation device.

Meanwhile, if first processing section 110 determines that the file is unnecessary for information processing device 12 (FIG. 2: NO in S021), second processing section 120 causes internal system 10 to stop execution of the relay processing (FIG. 2: S023). Correspondingly, accumulation by internal system 10 of the packets constituting the file determined to be unnecessary for information processing device 12 is stopped, or accumulation of the packets exceeding an upper limit of the accumulated amount is stopped. Thereafter, on the condition that it is determined by first processing section 110 that the file is necessary for information processing device 12 (FIG. 2: YES in S013 and S021), second processing section 120 causes internal system 10 to remove the stoppage, and causes it to execute the relay processing (FIG. 2: S022). Furthermore, second processing section 120 determines whether the time during which accumulation of the packets is stopped (or, the time during which accumulation of the packets is stopped so as not to exceed the upper limit of the accumulated amount) "t" has exceeded a threshold value "$t_{TH}$" (FIG. 2: S024). If second processing section 120 determines that the time "t" to stop packet accumulation has exceeded the threshold value "$t_{TH}$" (FIG. 2: YES in S024), it causes internal system 10 to erase (discard) part or all of the accumulated packets from the memory (FIG. 2: S025). It may also be configured such that part or all of the accumulated packets are erased from the memory when the current time "t" has passed an effective period "$t_{TH}$" of the packets or the file.

According to information management system 100 exerting the above-described functions, it is possible to prevent execution of undesirable processing where even the packets constituting the file unnecessary for information processing device 12 mounted on motor vehicle 1 are unconditionally stored or accumulated, or even decoded (FIG. 2: NO in S013 and S021, S023). Specifically, when the file is determined to be unnecessary for every information processing device 12 mounted on motor vehicle 1, accumulation of the packets constituting the relevant file exceeding the limited amount is stopped. This ensures that the part of the resources (memory capacity for accumulating the packets, information processing capabilities of CPU and/or LSI for decoding, and others) for the relay processing that has been saved by stoppage of the relay processing, can be allocated to the relay processing of another file or other information processing. Accordingly, it is possible to manage information processing by internal system 10 mounted on motor vehicle 1 to ensure efficient use of the information processing resources with regard to the packets distributed from external system 20.

Further, accumulation of the packets constituting the file unnecessary for information processing device 12 is stopped (FIG. 2: S023). Accordingly, the information processing resources for the relay processing including packet accumulation and decoding can be allocated to the relay processing of the file necessary for information processing device 12, to ensure efficient use of the resources for communication processing by internal system 10.

Furthermore, upon transition of the state where the file is unnecessary for information processing device 12 and thus accumulation of the packets constituting the file is being stopped to the state where the file is necessary for information processing device 12, accumulation of the packets is restarted (see FIG. 2: S013, S014, S021, and S022). That is, for the file that is currently unnecessary for information processing device 12 but may become necessary in the future, the packets constituting the file are accumulated to some degree, and collection and accumulation of the same are restarted when the file actually becomes necessary. In this manner, compared to the case where collection and accumulation of the necessary packets are started after the change of the state, the time required for collecting and accumulating the packets necessary to restore the file that has now become necessary for information processing device 12 is reduced.

Meanwhile, the accumulated amount of packets is restricted as described above, and thus, the information processing resources for the file relay processing including accumulation of the packets can be allocated to other information processing including the relay processing of the file necessary for information processing device 12.

Still further, when the time "t" during which accumulation of the packets exceeding the limited amount is stopped exceeds the threshold value "$t_{TH}$", part or all of the accumulated packets are erased or discarded from the memory (FIG. 2: YES in S024, S025). As such, the packets constituting the file that is determined to be probably or certainly unnecessary for information processing device 12 can be erased. Accordingly, the information processing resources for accumulation of the packets and others can be allocated to accumulation of the packets constituting the file that is necessary or very likely necessary for information processing device 12 and others, which ensures efficient use of the information processing resources for the relay processing of the file necessary for information processing device 12 to the relevant information processing device 12.

While internal system 10 and information management system 100 are mounted on the four-wheeled motor vehicle 1 in the above embodiment, they may be mounted on any kinds of mobile apparatuses having the mobile function, which may be a two-wheeled bicycle, a farm working machinery, a legged mobile robot, and the like.

Furthermore, it may be configured such that first processing section 110 recognizes the degree of necessity of each file for information processing device 12 based on the file information described above, and, on the condition that the accumulated amount of the packets by internal system 10 has reached the upper limit, second processing section 120 causes internal system 10 to preferentially erase or discard the packets constituting the file recognized to be low in degree of necessity by first processing section 110 from among the accumulated packets.

According to information management system 100 having the above-described configuration, when the accumulated amount of the packets by internal system 10 has reached the upper limit, the packets of a lower level of importance for information processing device 12 are preferentially erased or discarded from the memory. Accordingly, the packets of a higher level of importance for information processing device 12 can be preferentially accumulated by internal system 10, and the relay processing including restoration of the relevant packets to the file can be executed preferentially.

What is claimed is:

1. A system for processing packets of a file on a mobile apparatus, the system comprising:
   an internal system mounted on the mobile apparatus and configured to receive destination information for designating an information processing device as a destination of the file, version information for identifying the version of the file, and a file identifier for identification of the file from an external system;
   an information processing device mounted on the mobile apparatus and configured to receive the file from the internal system via an output circuit; and
   an information management system integrated with the internal system and the information processing device on the mobile apparatus for managing relay processing including collection and accumulation of the packets distributed or broadcast from the external system by the internal system, decoding of the accumulated packets to restore the file, and outputting of the file to the information processing device, the information management system comprising:
   a first processing section configured to determine the necessity/unnecessity of the file for the information processing device as a destination of the file based on the destination information and the version information; and
   a second processing section configured to control the internal system to execute the relay processing of collecting, accumulating, decoding, and outputting the file having the file identifier on the condition that it is determined by the first processing section that the file is necessary for the information processing device.

2. The system according to claim 1, wherein the first processing section outputs the destination and version information to the information processing device, and determines necessity/unnecessity of the file for the information processing device in accordance with a type or presence/absence of a response signal received from the information processing device.

3. The system according to claim 2, wherein the response signal from the information processing device is generated based on the version information of the file.

4. The system according to claim 2, wherein the response signal from the information processing device is generated based on the destination information.

5. The system according to claim 1, wherein the second processing section is further configured to control the internal system to stop accumulation of the packets constituting the file when the first processing section determines that the file is unnecessary for the information processing device.

6. The system according to claim 5, wherein the second processing section is further configured to control the internal system to remove the stoppage of the accumulation of the packets constituting the file when the first processing section subsequently determines that the file is necessary for the information processing device.

7. The system according to claim 5, wherein the second processing section is further configured to control the internal system to erase or discard part or all of the accumulated packets when the time during which the accumulation of the packets is stopped has exceeded a threshold value or a current time has passed an effective period of the packets or the file.

8. The system according to claim 1, wherein the internal system is configured to receive from the external system a degree of necessity of the file;
   wherein the first processing section is further configured to recognize the degree of necessity of the file, and
   wherein when the amount of packets accumulated by the internal system has reached an upper limit, the second processing section is further configured to control the internal system to preferentially erase or discard the packets constituting the file from the accumulated packets if the file is recognized by the first processing section to have a lower degree of necessity than files associated with other accumulated packets.

9. The system according to claim 1, wherein the mobile apparatus is a motor vehicle.

10. The system according to claim 1 further comprising a computer mounted in the mobile apparatus and an information management program for causing the computer to function as the information management system.

11. The system according to claim 10, wherein part or all of the information management program is distributed or broadcast to the computer.

* * * * *